United States Patent
Segall et al.

(10) Patent No.: US 9,060,254 B2
(45) Date of Patent: *Jun. 16, 2015

(54) METHOD AND SYSTEM FOR MANAGING INTERACTIVE COMMUNICATIONS CAMPAIGNS WITH TEXT MESSAGING

(71) Applicant: Soundbite Communications, Inc., Bedford, MA (US)

(72) Inventors: Timothy R. Segall, Lexington, MA (US); Boris Greenberg, Stoneham, MA (US)

(73) Assignee: SOUNDBITE COMMUNICATIONS, INC., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/913,395

(22) Filed: Jun. 8, 2013

(65) Prior Publication Data

US 2014/0037082 A1    Feb. 6, 2014

Related U.S. Application Data

(63) Continuation of application No. 12/626,312, filed on Nov. 25, 2009, now Pat. No. 8,462,918.

(51) Int. Cl.
| | |
|---|---|
| *H04M 11/00* | (2006.01) |
| *H04W 4/12* | (2009.01) |
| *H04M 3/42* | (2006.01) |
| *H04M 3/51* | (2006.01) |

(52) U.S. Cl.
CPC ............ *H04W 4/12* (2013.01); *H04M 3/42382* (2013.01); *H04M 3/5158* (2013.01)

(58) Field of Classification Search
USPC ................ 379/88.11–88.25, 265.01, 266.07, 379/88.13, 93.12; 705/7.12, 34, 40, 14.49, 705/42; 455/466; 709/206, 223, 204
See application file for complete search history.

(56) References Cited

U.S. PATENT DOCUMENTS

| | | | |
|---|---|---|---|
| 4,988,209 A | 1/1991 | Davidson et al. | |
| 5,008,930 A | 4/1991 | Gawrys et al. | |
| 5,825,870 A | 10/1998 | Miloslavsky | |
| 5,963,635 A * | 10/1999 | Szlam et al. | 379/309 |
| 5,991,395 A | 11/1999 | Miloslavsky | |
| 6,170,011 B1 * | 1/2001 | Macleod Beck et al. | 709/224 |
| 6,285,752 B1 | 9/2001 | Rice | |
| 6,363,145 B1 | 3/2002 | Shaffer et al. | |
| 6,381,640 B1 * | 4/2002 | Beck et al. | 709/223 |
| 6,621,900 B1 | 9/2003 | Rice | |
| 6,708,039 B2 * | 3/2004 | Harder | 455/466 |
| 6,842,772 B1 | 1/2005 | Delaney et al. | |
| 6,931,112 B1 | 8/2005 | McFarland et al. | |
| 6,980,640 B2 | 12/2005 | Rice | |
| 7,103,562 B2 | 9/2006 | Kosiba et al. | |
| 7,110,524 B2 | 9/2006 | Rupe et al. | |
| 7,184,521 B2 | 2/2007 | Sikora et al. | |
| 7,353,182 B1 * | 4/2008 | Missinhoun et al. | 705/7.12 |
| 7,386,102 B2 | 6/2008 | Summe et al. | |
| 7,966,496 B2 * | 6/2011 | Ellmore | 713/182 |
| 8,254,531 B2 * | 8/2012 | Salonen | 379/88.13 |
| 2001/0025329 A1 | 9/2001 | Sheikh et al. | |

(Continued)

*Primary Examiner* — Olisa Anwah (74) *Attorney, Agent, or Firm* — Christie, Parker & Hale, LLP (57) ABSTRACT

A messaging platform includes a text messaging subsystem that includes a suite of enhancements that facilitate implementation of a multi-channel communications strategy with high level and fine-grained control over outbound message creation or inbound message handling.

14 Claims, 3 Drawing Sheets

(56) References Cited

U.S. PATENT DOCUMENTS

| | | | |
|---|---|---|---|
| 2004/0029638 A1 | 2/2004 | Hytcheson et al. | |
| 2005/0111631 A1* | 5/2005 | Jordan, Jr. | 379/88.12 |
| 2005/0169235 A1 | 8/2005 | Hutcheson et al. | |
| 2007/0073808 A1 | 3/2007 | Berrey et al. | |
| 2007/0172050 A1* | 7/2007 | Weinstein et al. | 379/266.07 |
| 2008/0133283 A1* | 6/2008 | Backer et al. | 705/5 |
| 2008/0189162 A1* | 8/2008 | Ganong et al. | 705/9 |
| 2008/0235342 A1 | 9/2008 | Aaltonen et al. | |
| 2008/0275986 A1* | 11/2008 | Chen et al. | 709/224 |
| 2008/0288384 A1* | 11/2008 | Collins et al. | 705/35 |
| 2009/0186700 A1* | 7/2009 | Konkle | 463/42 |
| 2009/0238353 A1* | 9/2009 | Mani | 379/201.02 |
| 2011/0054977 A1* | 3/2011 | Jaffer | 705/9 |
| 2011/0123016 A1* | 5/2011 | Segall et al. | 379/266.07 |
| 2011/0213657 A1* | 9/2011 | O'Malley et al. | 705/14.49 |
| 2011/0238544 A1* | 9/2011 | Segall | 705/34 |

* cited by examiner

METHOD AND SYSTEM FOR MANAGING INTERACTIVE COMMUNICATIONS CAMPAIGNS WITH TEXT MESSAGING

BACKGROUND

1. Technical Field

This disclosure relates generally to a method and system for managing interactive communication campaigns over a computer network, such as the Internet.

2. Description of the Related Art

It is known to provide a web-based hosted solution through which business entities create and manage interactive or notification communications campaigns. An example of an interactive communications campaign is a telephone campaign to determine whether a target recipient desires to transfer a credit card balance to a new account, a campaign to remind a recipient that a credit card payment is due and to offer the recipient an opportunity to speak with a customer representative concerning any payment issues, or the like. The hosted solution typically is implemented as an application (or "managed") service provider. One or more business entities ("clients") that desire to use the service typically register and access the service through an on-line (e.g., web-based) portal. In one representative use scenario, the managed service provider entity provides outbound telemarketing services on behalf of participating clients. The campaign typically is provisioned by the client. Thus, for example, using a web-based interface, a participating client defines a script for the campaign, imports a set of contacts, and defines one or more parameters that govern how the campaign is to be run. At a designated time, the service provider initiates the campaign, e.g., by providing the contacts to a set of telephone servers that set-up and manage the telephone calls to the targets of the campaign. During a given outbound voice call, as noted above, a recipient (a "customer") may be afforded an option to connect to a contact center, e.g., to speak to a customer representative. In such implementations, the hosted solution typically is integrated directly with the contact center's on-premises automatic call distributor (ACD).

The rise in mobile phone usage and the dramatic increase in text messaging are transforming the way individuals communicate with one another. Today in the United States, text messaging is the most popular data service among the hundreds of million mobile phone subscribers. This creates a powerful opportunity for organizations to enhance their brand and build profitable, life-long relationships with their customers. Text messaging is a perfect augmentation to automated voice messaging campaigns, creating both a significant lift in call-backs and dramatic increase in interactive responses for many types of customer communications.

BRIEF SUMMARY

A messaging platform includes a text messaging subsystem that includes a suite of enhancements that facilitate implementation of a multi-channel communications strategy with high level and fine-grained control over outbound message creation or inbound message handling.

A text messaging campaign refers to a series of contacts (outbound and/or inbound) with respect to a contact list using one or more sub-campaigns that use a given script. A campaign typically has a preset configuration that applies to all of its sub-campaigns. A "sub-campaign" refers to one or more passes through a contact list using a script and that is constrained to a particular timeframe (or to a set of one or more such times). A "script" may have associated therewith various control functions for generating outbound messages, handling inbound messages, and the like. As one example, a script may be used to send a text message as a follow-up to a voice message, or vice versa, to provide a blended (or multi-channel) campaign. The script may be used to determine whether an outbound or inbound telephone number is associated with a wireless telephone number (such that text messaging may be enabled), to determine whether a given customer account in which the script is running is authorized to send text messages, and the like. The text messaging subsystem also provides support for event-based text messaging sub-campaigns, and it enables agents (associated with the system) to manage inbound messages more efficiently.

The foregoing has outlined some of the more pertinent features of the subject matter. These features should be construed to be merely illustrative. Many other beneficial results can be attained by applying the disclosed subject matter in a different manner or by modifying the subject matter as will be described.

DETAILED DESCRIPTION

Figure 1:
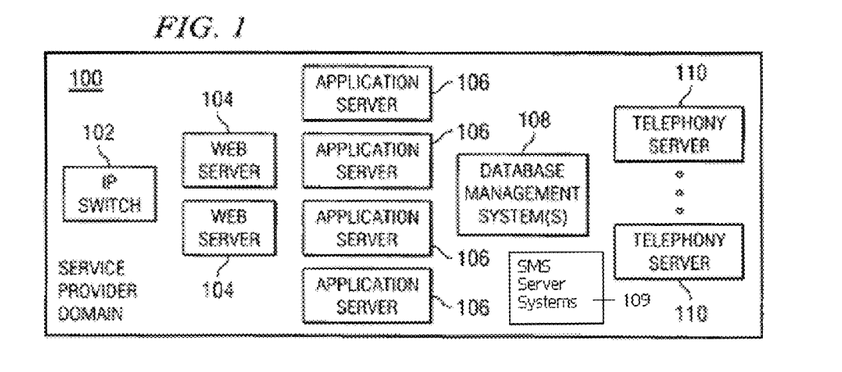
FIG. 1 is a block diagram of a service provider infrastructure for implementing a managed communications campaign service.

FIG. 1 illustrates a representative service provider or system architecture, which in the preferred embodiment is implemented in or across one or more data centers. A data center typically has connectivity to the Internet. The system provides a web-based hosted solution through which business entities create and manage communications campaigns. Campaigns may be interactive or non-interactive. Representative campaigns include, without limitation, account renewal campaigns, balance transfer or consolidation offer campaigns, billing issue campaigns, credit card activation campaigns, fraud alert campaigns, payment or past due reminder campaigns, customer survey campaigns, debt recovery campaigns, late payment with right party verification campaigns, payment reminder with direct connect to contact center campaigns, appointment reminder campaigns, welcome campaigns, account renewal campaigns, affinity cross-sell/rewards program campaigns, crisis management/disaster recovery campaigns, new product offer campaigns, inquiry/web follow-up campaigns, contract renewal campaigns, service availability notification campaigns, promotional offer campaigns, service delivery confirmation campaigns, and the like. The particular type of campaign is not a limitation or feature of the invention.

A business entity (a "client") user has a machine such as a workstation or notebook computer. Typically, a business entity user accesses the service provider architecture by opening a web browser on the machine to a URL associated with a service provider domain. Access may also be through an automated process, such as via a Web services application programming interface (API). Where a web browser is used, the client authenticates to the managed service in the usual manner, e.g., by entry of a username and password. The connection between the business entity machine and the service provider infrastructure may be encrypted or otherwise secure, e.g., via SSL, or the like. Although connectivity via the publicly-routed Internet is typical, the business entity may connect to the service provider infrastructure over any local area, wide area, wireless, wired, private or other dedicated network. As seen in FIG. 1, the service provider architecture 100 comprises an IP switch 102, a set of one or more web server machines 104, a set of one more application server machines 106, a database management system 108, a set of SMS message servers 109, and a set of one or more telephony server machines 110. A representative web server machine 104 comprises commodity hardware (e.g., Intel-based), an operating system such as Linux, and a web server such as Apache 2.x. A representative application server machine 106 comprises commodity hardware, Linux, and an application server such as WebLogic 10.3 (or later). The database management system 108 may be implemented as an Oracle (or equivalent) database management package running on Linux. A representative telephony server machine is an application server that implements appropriate software applications for call set-up, voice processing, and other call connection and management activities. An application may implement the Media Resource Control Protocol (MRCP). In the alternative, a telephony server machine may execute an application server in conjunction with one or more PSTN, VoIP and/or voice processing cards that provide interconnectivity for telephone-based calling applications. In a card-based embodiment, a representative card is a CG 6565 (or variant) series available from Dialogic, or an equivalent. Typically, a voice processing application port or card has a finite number of supported ports. In a high volume call environment, there may be several web server machines, several application server machines, and a large number of telephony server machines. Although not shown in detail, the infrastructure may include a name service, FTP servers, MRCP (Media Resource Control Protocol) servers, load balancing appliances, other switches, and the like. Each machine typically comprises sufficient disk and memory, as well as input and output devices. The software environment on each machine includes a Java virtual machine (JVM) if control programs are written in Java. Generally, the web servers 104 handle incoming business entity provisioning requests, and they export a management interface that is described in more detail below. The application servers 106 manage the basic functions of generating campaign scripts, managing contacts, and executing campaigns. As will be discussed below, the campaign may provide end users voice messages, text messages, email messages, or combinations thereof. For voice messaging, the telephony servers 110 handle most telephony-related functions including, without limitation, executing outbound calls and forwarding calls to a contact center. The particular hardware and software implementation details described herein are merely for illustrative purposes are not meant to limit the scope of the present invention.

In a representative embodiment, a typical machine in the service infrastructure is a processor-based server running Linux, and the server includes a telephone interface. A typical interface has up to 240 ports, and each port may be considered a separate telephone line. There are typically a set of such servers operating at a given location (e.g., an Internet data center). The following is a typical operation of the voice messaging service. Using a Web browser or the Web service API, a client provisions a campaign, provisioning a script to be played to a target customer. The scope and content of the script will depend on the campaign. The client also provides the service provider with contact information for a set of persons, who are the target recipients of the campaign. In operation, the system batches a subset of those contacts to one of the machines in the server farm. A control routine executing on the machine takes a first contact in the subset and assigns the contact to an available port. The script is then initiated and the interface card initiates a call over a port. When the recipient's phone is answered, the system determines whether a human being has answered the call (as opposed to an answering machine, a fax, or the like). If a human being has answered, the script plays a set of prompts (basically a set of scripted questions). During the call, if the target recipient takes a given action, a direct-connect (DC) function is initiated. In particular, the system places the call on hold, opens up a separate line to a contact center telephone number (typically provisioned by the client), waits for an agent to respond, places the responding agent on hold, and then bridges the customer to the agent. The system then disconnects. In an alternative, the DC function may take place whether or not the recipient actively initiates it, e.g., by just having the system inform the recipient to "please hold" while the connection to the contact center is established by the service provider.

The contact center may be owned, operated or managed by a third party. The service provider may manage the agents directly. A representative contact center includes automatic call distribution (ACD) functions. As is well-known, an ACD is a computer-implemented and controlled telephone system that distributes calls to contact center agents equitably and gathers statistics about the agents. When the service provider controls and/or manages the agents directly, the provider infrastructure may include a dialer, which is an automatic telephone dialing system. A dialer initiates outbound call from a list of telephone numbers, turns a call over to an agent when a human being responds, and gathers statistics about agents. Such ACD and dialer technologies are well-known.

Using the service provider infrastructure, a business entity can create, execute and manage a message (voice, text, email, or combination) campaign. As noted above, a campaign may have associated therewith one or more "sub-campaigns." Using a Web interface, a client loads a list of contacts who will be called and associates that list with a script. A "sub-campaign" refers to one or more passes through a contact list that has been bound to a script and that has been associated with a given timeframe. Thus, a "sub-campaign" associates at least the following items: a list of contacts, a script, and a timeframe. Additional details regarding sub-campaigns are set forth below. As noted above, a script determines what will happen during a contact (e.g., an outbound voice call). Typically, a script is formatted as XML and (in a voice message scenario) specifies a sequence of audio prompts that are played and what happens when the recipient takes certain actions such as pressing a button on the phone or speaking a response. As noted above, a direct-connect to the contact center may be carried out automatically (merely when the system determines that the call has been answered by other than an answering machine) and thus the script may designate this functionality.

One or more contact lists are stored in a contact database, and typically a contact list comprises a set of contacts. A contact typically is an individual in the contact database, and this individual is sometimes referred to as the "customer" (as, technically, the individual is a customer of the client using the managed service). A contact can include home, work or cell numbers, a client identifier, an email address, or the like. Also, contacts typically include first name, last name, company and other information.

Figure 2A:
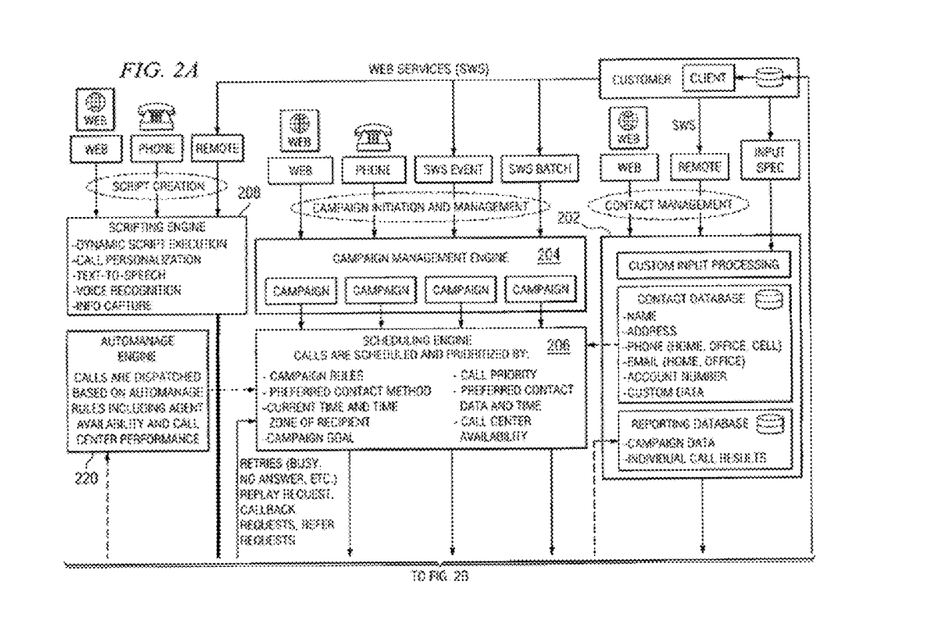
FIGS. 2A-2B illustrates how an interactive communications campaign is created and managed in the service provider infrastructure illustrated in FIG. 1.
Figure 2B:
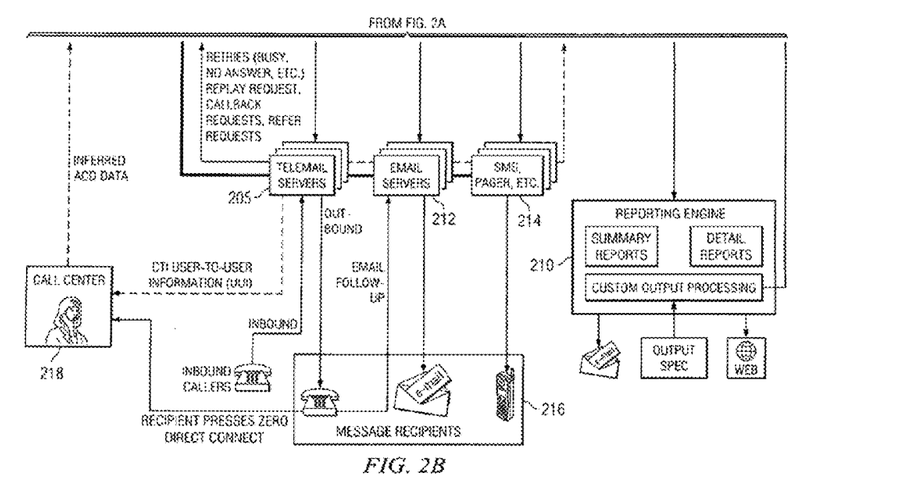
Figure 3:
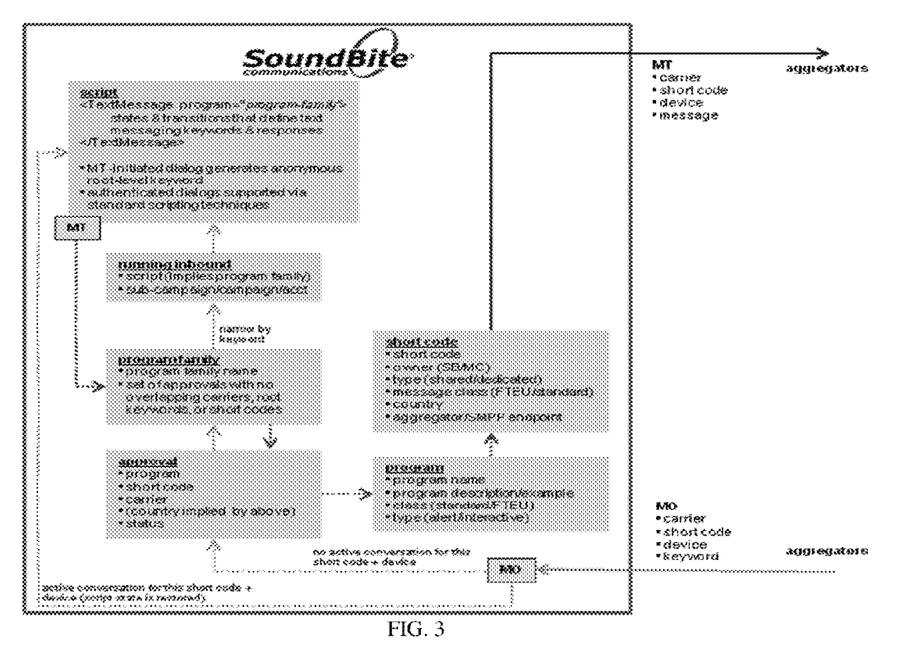
FIG. 3 is a diagram that illustrates how short code and program management functions are implemented in the text messaging subsystem.

With reference to FIGS. 2A-2B, and as described above, a business entity connects to the service provider, authenticates, and then uses one or more applications to create, execute and manage the campaign. These applications execute on the application server machines and operate in association with one or more databases that are supported within the database management system. These applications include, for example, a contact management application 202, a campaign management engine 204, a scheduling engine 206, and a scripting engine 208. The contact management application 202 handles the receipt and storage of the contact list(s) uploaded (e.g., via FTP or otherwise) to the system by or on behalf of the business entity client. The scripting engine 208 handles the creation and managing of the campaign scripts, using instructions entered by or on behalf of the business entity client via a web-based interface or Web services API. The campaign management engine 204 manages the campaign by interoperating with the scheduling engine 206, which in turn interoperates with the telephony servers 205 to execute the campaign. The business entity client evaluates or monitors the campaign from summary, detail and/or custom reports generated by a reporting engine application 210. Campaign evaluation and monitoring may also be performed via a Web-based user interface, or in an automated manner via an API. Notification campaigns are executed using email servers 212 and SMS (or MMS) servers 214, or by other means, such as by telephone.

As also illustrated in FIGS. 2A-2B, after connecting an outbound call to a target customer 216, the customer may elect to be connected to the contact center 218 (typically a third party contact center) or the system may perform that direct-connect automatically once it determines that a human being (as opposed to an answering machine) has answered the outbound call. (An end user may also send a message (e.g., an SMS) to the system). The system typically obtains information about the contact center's performance during a given communications campaign, commonly without requiring a direct connection between the infrastructure and a contact center's on-premises ACD. This enables the managed service provider to integrate with both its business entity clients and with their associated contact center environments rapidly and efficiently. The interconnectivity between the managed service provider and the contact center may be "inferred" from how calls that originate from the service provider to the target recipients (who have expressed an interest in being connected to the contact center) are actually handled. This "indirect" connectivity is illustrated in FIG. 2 by the control engine 220, which can be provided in software as a set of software instructions executable on a processor. In the voice messaging scenario, the engine is responsible for dispatching messages at an appropriate rate while ensuring that all customer-requested rule parameters (as described below) are honored. Examples of such parameters include: number of agents available at the contact center, maximum hold time at the contact center, client abandon rate prior to speaking to a contact center, number of bad numbers reached on the outbound dial, and so forth. Generally, for a given client campaign or sub-campaign, the engine 220 decides on an initial message dispatch rate based on the client-requested parameters (and, optionally, on historical data from like campaigns or sub-campaigns). Once the campaign or sub-campaign, as the case may be, starts running, the engine 220 monitors the parameters and ensures that they remain within tolerance. If an identified parameter exceeds the client-defined value, then a system action rule (e.g., adjusting the message dispatch rate, suspending the sub-campaign, or the like) is applied and any client notification requested is issued. Additional details regarding the functionality of the engine 220 are described in U.S. Publication No. 2007/0172050, which is commonly-owned.

As noted above, preferably a web-based interface is provided to enable a business entity client to create a set of one or more management rules that, when triggered during the campaign, cause the infrastructure (and, in particular, certain control applications therein) to take certain control actions in real-time, preferably based on campaign performance. A campaign may include several preset strategies that a client may choose to change based on day of week or time of day.

As used herein, the following terms have the associated meanings. As noted above, a "campaign" refers to an overall series of messages to a contact list using one or more sub-campaigns that use a given script. Campaigns also act as templates for the sub-campaigns that are created under them. A campaign typically has a preset configuration that applies to all of its sub-campaigns. As noted above, a "sub-campaign" refers to one or more passes through a contact list using a script and that is constrained to a particular timeframe (or at a set of one or more such times). A sub-campaign typically runs under an existing campaign. A "script" as noted above determines what happens during a customer interaction (e.g., a phone call for a voice campaign). Commonly, the script specifies (for a voice call) a sequence of audio prompts that are played to a client (an end user who receives a call) and what happens (the contact center connection) when the recipient takes certain actions (such as pressing a button on the phone or speaking an answer to a query). The script may also specify other actions, such as effecting a contact center connection automatically when detecting that a human being has answered. The nature and type of actions set forth in a script thus may be quite varied, and this disclosure is not limited to any particular process flow within a script.

An "agent" typically is a contact center operator. A "skill group" is a set of agents that are trained to handle a given script. In one embodiment, a skill group defines the number of agents who are scheduled to be on duty at various times of the day on various days of the week, as well as the phone number to use to contact those agents. A skill group can be shared across multiple sub-campaigns or over multiple physical facilities (e.g., telephone numbers). A script may cause the routing of direct-connect calls to different skill groups based on the path through the script. A client of the service may assign a skill group to a sub-campaign when it creates the sub-campaign, whereupon the agents in that skill group are then responsible for handling any incoming messages for that sub-campaign. Agents in a skill group become "live" according to a schedule or upon login to the service provider. Thus, in one embodiment a "live" agent is an agent that has been registered with the service provider, e.g., using a supervisor dashboard or a contact center schedule. An "unallocated" agent is an agent that is not yet allocated to a sub-campaign. An "allocated" agent is an agent that is allocated to a sub-campaign. A "busy" agent is an agent currently assisting a client. An "available" agent is an agent waiting for work. A "break" is a state when the agent is away from his or her station. The acronym "ACW" refers to "after-call-work" or agent processing, which occurs after a particular customer service is completed and before the agent is servicing a new customer contact.

In one embodiment, agents in a skill group may be automatically allocated to a particular sub-campaign based on a priority of each running sub-campaign. This is not a requirement, however. Thus, for example, sub-campaigns with a higher priority are given as many agents as they can use before a lower-priority sub-campaign is considered. Sub-campaigns of equal priority are allocated agents according to a number of agents that can be used (or the number of available contacts) in a next time period (e.g., 5 minutes). In the alternative, such prioritization of sub-campaigns need not be enforced across agents in a skill group, thereby enabling more equal access to the agents. The agents allocated to each sub-campaign typically changes over time as the number of available contacts changes (which affects the number of agents that can be used by each sub-campaign). Preferably, the system adjusts the rate for a sub-campaign based on several factors: the number of agents currently being used by the sub-campaign, the percentage of attempts that result in a direct connect attempt, and an average length of a successful direct connect call.

As noted above, agent allocation is not a requirement. In the alternative, agents in a skill group are either taking a call or are idle. They may receive a call from any sub-campaign currently assigned to the skill group. In this embodiment, a priority value determines if a particular sub-campaign should be dialed at a faster rate than another. This results in one sub-campaign generating more direct-connects and requiring more agents from the pool of available agents.

Typically, a skill group is based on one or more business requirements. For example, skill groups may be based on skill type, language skills, skill level, or other such factors. When a new sub-campaign is created, a skill group is assigned to that sub-campaign. The schedule for the skill group then determines the messaging rate at any given time. As more agents come on duty, typically the rate increases to keep those agents busy. When fewer agents are on duty, however, the rate decreases to avoid long hold queues for the customers. As noted above, a single skill group can be assigned to multiple sub-campaigns at the same time. Messages from each sub-campaign preferably are sent to any available agent in the skill group, so a given agent should be trained to handle messages from each of the sub-campaigns.

There may be different types of skill groups, such as a standard skill group, and an enhanced agent mode skill group. The standard skill group typically is a skill group to which a single phone number is assigned, and that number is a default phone number when there is no other number defined in the script. A standard skill group typically does not use a service-side hold queue, as defined below. With a standard skill group, agents always hang up after the client call has completed. Caller ID can be used to generate an agent screen pop-up window with the correct customer information if the client's infrastructure supports the capability. As an alternative, an audible "whisper" with customer information can be played for the agent prior to completing the connection. Agents may take advantage of a service-side hold queue to "stay-on-line" (remain connected and to receive a next customer after the last customer hangs-up, as described in more detail below). If agents remain connected, caller ID typically is not used for the screen pop-up because, typically, caller ID cannot be changed after the first call the agent's phone has been placed. If the enhanced agent mode skill group mode is used, contacts connect directly to a specific agent who has his or her own unique telephone number. Thus, when this type of skill group is configured, individual agents are added (by name) together with the associated telephone numbers. In this configuration, each agent has a unique phone number, or each agent may be set up with a different extension where one or more agents share the unique phone number. As with the standard mode configuration, agent mode skill groups use a pre-defined schedule. Individual agents, however, can each have a custom schedule or can participate in a common schedule group. The service provider can track individual agent activity in this mode, and agents use the hold queue and can stay-on-line as described above. In this mode, caller ID is not used for an agent screen pop-up window.

The system preferably executes a program to provide an agent "portal" by which an administrator (e.g., a supervisor) can administer and manage agents. The portal typically includes an agent screen, and a supervisor screen. A server component executes in the service provider system infrastructure, and a client component executes in the agent's desktop, preferably in a web browser. When the system is operating in the enhanced agent mode skill group configuration, the status of the individual agents can be viewed. This view contains information, such as the client contact with whom the agent is being connected. In this embodiment, a web page can be used as a screen pop to pass information to the agent about the contact. Typically, an agent operating in this mode has the following mutable attributes: skill group, telephone number, sub-campaign, and state (e.g., unallocated, available, busy, ACW, handoff, break, hold queue, or unavailable). The agent also can be visualized from the perspective of his or her identity, authentication information, permissions and access rights. Preferably, upon connection to the service provider or the appropriate contact center system, the agent's screen is refreshed periodically (e.g., once per second). The server-client screen pop functionality may be implemented in any convenient manner using existing technologies such as Comet, AJAX, XMPP, and the like. Comet is a WWW architecture in which a web server sends data to a client program (normally a web browser) asynchronously without any need for the client to explicitly request it. This allows for the creation of an event-driven web application. XMPP refers to eXtensible Messaging and Presence Protocol (f/k/a Jabber), which is an open, XML-based protocol for near real-time, extensible instant messaging (IM) and presence information (a/k/a buddy lists). XMPP is extensible and can support other features such as voice over IP (VoIP) and file transfer. In a representative embodiment, an agent has a telephony connection and an associated machine (e.g., a desktop computer, a laptop computer or other mobile computing device, or the like) that comprises a web browser or other rendering engine that is compatible with AJAX technologies (e.g., XHTML, XML, CSS, DOM, JSON, and the like). AJAX technologies include XHTML (Extensible HTML) and CSS (Cascading Style Sheets) for marking up and styling information, the use of DOM (Document Object Model) accessed with client-side scripting languages, the use of an XMLHttpRequest object (an API used by a scripting language) to transfer XML and other text data asynchronously to and from a server using HTTP), and use of XML or JSON (Javascript Object Notation, a lightweight data interchange format) as a format to transfer data between the server and the client.

The following describes a typical life cycle for an un-owned agent. Once an agent enters the live state, he or she is typically unallocated. Once the agent is allocated to a specific sub-campaign, he or she enters an available state. The system then establishes and maintains the persistent telephony connection to the agent, as previously described. Once a customer request occurs (a client has requested a direct-connect), the agent enters various states, such as busy. After the call is completed, the agent enters (or may enter) the ACW state, after which the agent transitions back to the available state where he or she can receive a next call.

Text Messaging Enhancements

The above-described message infrastructure includes a "text messaging susbsystem"—namely, appropriate interfaces, applications, utilities and control processes to enable customers to use the platform to send and receive text messages from mobile devices. A representative text messaging application is described in co-pending Ser. No. 11/534,258, which is commonly-owned. The disclosure of that application is incorporated herein by reference.

As used herein, a "mobile device" interacts with the text messaging subsystem of the platform to receive "outbound" messages issued from the subsystem, and to send "inbound" messages to the platform (or, more commonly, to an "agent" associated with the platform. As used herein, a "mobile device" should be broadly construed. It includes any wireless client device, e.g., a cellphone, pager, a personal digital assistant (PDA, e.g., with GPRS NIC), a mobile computer with a smartphone client, or the like. A typical mobile device is access protocol-enabled device (e.g., an iPhone°, a Blackberry° device, a Google Android, or the like) that is capable of sending and receiving data in a wireless manner using the wireless application protocol. A typical access protocol is the wireless access protocol (WAP), but these devices can also take advantage of other protocols such as HTTP/HTML. WAP allows users to access information via wireless devices, such as mobile phones, pagers, two-way radios, communicators, and the like. WAP supports wireless networks, including CDPD, CDMA, GSM, PDC, PHS, TDMA, FLEX, ReFLEX, iDEN, TETRA, DECT, DataTAC, and Mobitex, and it operates with many handheld device operating systems, such as PalmOS, EPOC, Windows CE, FLEXOS, OS/9, and JavaOS. Typically, WAP- or HTTP/HTML-enabled devices use graphical displays and can access the Internet (or other communication network) on so-called mini- or micro-browsers, which are web browsers with small file sizes that can accommodate the reduced memory constraints of handheld devices and the low-bandwidth constraints of a wireless networks. In a representative embodiment, the mobile device is a cellular telephone that operates over GPRS (General Packet Radio Service), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Generalizing, a mobile device as used herein is a 2.5 G- or 3G- (or next generation) compliant device that includes a subscriber identity module (SIM), which is a smart card that carries subscriber-specific information, mobile equipment (e.g., radio and associated signal processing devices), a man-machine interface (MMI), and one or more interfaces to external devices (e.g., computers, PDAs, and the like). The techniques disclosed herein are not limited for use with a mobile device that uses a particular access protocol.

The text messaging system includes a number of enhanced features that are now described.

1. Event-Based Support for Text Messages

The text messaging system provides event-based support for text messages. In particular, according to this disclosure, an event-based sub-campaign (defined within a given campaign) also has the ability to send text messages. Preferably a "pass" within a given event-based sub-campaign is single channel, and the sub-campaign automatically creates a new sub-campaign for each new day (although this is not a limitation). Thus, to support text messages (and email) within an event-based sub-campaign paradigm as provided herein, the system automatically creates a new pass for each channel for each day.

Preferably, the platform supports "blending"—wherein the type of message provided to a contact changes from one channel type to another channel type (e.g., voice to text, text to voice, text to email, email to text, and so forth). Preferably, event-based sub-campaigns that support text messaging also support blending such as an event-based voice call is able to initiate a text message follow-up, or vice versa, under script control. Preferably, when a user of the system sets up an event-based sub-campaign, the system user interface (UI) allows him or her to choose (e.g., via checkboxes or other menu controls) which channels the event-based sub-campaign supports. The available channels are constrained by the customer's account configuration. When a new contact (or list of contacts) is added to an event-based sub-campaign, the following properties are implemented. If the device which would be attempted is an email address (and the event-based sub-campaign supports email), then the contact is added to an email pass. If the device which would be attempted is a landline telephone number (and the event-based sub-campaign supports voice messaging), then the contact is added to a voice pass. If the device which would be attempted is wireless (and the event-based sub-campaign supports text messaging), then the contact telephone number is added to a text message pass. If the device which would be attempted is a wireless telephone number (and the event-based sub-campaign does not support text messaging), then the contact is added to a voice pass. If the user prefers behavior different from the above (e.g., if the user wants wireless numbers to receive voice calls even when the account and event-based sub-campaign supports text), then the user can set up other event-based sub-campaigns per channel.

2. Short Code and Program Management

The text messaging system preferably includes support for short code management, as is now described. By way of background, the text messaging system includes an API or native application that interfaces to an aggregator function (which may be provided by a third party). The system can send text messages to the aggregator and receive responses and acknowledgements from an aggregator. The interface may support connection to multiple aggregators using multiple short codes. A short code has the following properties: a short code number (5-6 digits), a type (shared or dedicated), message class (standard or "free-to-end-user" (FTEU)), country, and aggregator/SMPP endpoint. The text messaging application includes support for short code management, which is now described.

As used herein, the following terms have the following definitions. A "program" is a type of message approved for use on particular short code over a set of carriers. Programs can be created, updated, and deleted, and a program has a program name, description, class (e.g., standard or FTEU), and type (alert or interactive). An "approval" represents the approval status of a particular program with a particular short code and carrier. Approvals can be created, updated, and deleted, and an approval has the following associated properties: a program, a short code, a carrier (which also implies country), and a status (e.g., submitted, approved, or the like). A "program family" preferably is defined as a set of approvals for a particular program with no overlapping carriers, root keywords, or short codes. Typically, a program family is determined programmatically by virtue of the short codes, programs and approvals.

When an inbound text arrives to the system, the system determines the program family (set of approvals) based on the carrier, originating device (telephone number), and destination short code. For each of these program families, preferably there is a set of unique top-level keywords that the system operator can create, edit or update. For active conversations (e.g., between and end user and an agent), preferably the keywords below the top level are controlled by a script within the particular account (as described below). Top-level keywords preferably have the following properties: a program family, an enterprise account to which they are assigned.

3. Script Support

A "script" and its use in the messaging platform for a given campaign or sub-campaign has been described above. A text messaging "script" preferably has the following additional capabilities. It specifies an initial outbound text message, and includes support for embedded contact fields and variables. It specifies a response to a help (or the like) message, and (in that regard) it includes support for embedded contact fields and variables. It specifies a response to an opt-out or opt-in message, and (in that regard) it includes support for embedded contact fields and variables. The script has the capability of calling a Web service application programming interface (API), including the system API, as well as one or more extension functions. The script maintains a state for a given conversation and takes different actions depending on the state, keywords used, value of variables, and the like. While top-level keywords are managed by the system, keywords below the top-level typically are managed within a script. A script may support inbound-initiated conversations as well as out-bound initiated conversations.

A script may be limited to text messaging-only, or it may include support for both text and voice.

A script may indicate that a text message or email is to be sent as a follow-up to a voice message. This is accomplished by allowing a state in a voice message script to include the sending of a text message or email. This may be via an XML state type, or via a call to an extension function that implements the operation. In one embodiment, the script may dictate that the text message may be sent to the current device (if wireless), another specified device in the contact (if wireless), or some arbitrary telephone number provided in the script (such as via a telephone capture module). In another embodiment, the script may dictate that the email message may be set to another specified device in the contact (if an email address), or an arbitrary email address provided by the script (such as via an email address capture module).

Although not meant to be limiting, preferably an attempt to send a text message from a voice script fails if the account is not associated with text messaging services using the platform.

Preferably, a message that is sent or initiated via the blending function (described above) is not considered part of any contact pass in a sub-campaign. Also, messages sent via blending preferably are counted and billed by the service provider just like any other messages that are sent in the sub-campaign.

Preferably, a script can determine whether a telephone number is wireless within a voice script. This number may be the current device, another specified device in the contact, or an arbitrary telephone number provided by the script (such as via a telephone capture module).

Preferably, a script can determine whether a telephone number is FTEU-capable within a script. This enables the script to vary its behavior based on whether a number is wireless or FTEU.

A script may also determine whether a customer account it is running in is authorized to send voice, text and/or email messages. This will vary depending on what services are contracted for by the customer. This function allows the script to offer different options to the user based on the authorized capabilities.

4. Agent Portal

The basic functionality of the agent portal has been described above. Preferably, the agent portal interface is extended to support text in addition to voice. A given agent may be dedicated to handling inbound voice contacts, or inbound messages, or both. The following provides additional details for text-only agents.

According to this disclosure, a queue is established to receive inbound messages. These messages are those that cannot be responded to by the system automatically. Preferably, each "text" agent, when logged in and available, is presented with a given (e.g., up to five (5)) inbound text messages to handle. This set of messages may be considered a "work unit" for the agent. When the agent completes handling the work unit, he or she can request another set of messages (if available). The messages that the agent receives preferably are from whatever sub-campaigns are using the skill group to which the agent is then assigned. Each inbound message typically includes the following information: message content, date/time received, client ID (if available), originating telephone number, country and short code, campaign/sub-campaign, message type (help, opt-out, opt-in, or other), and an indication of whether an auto-reply was sent. When the agent selects a message, the following additional information may be displayed: contact trace/history for the end user (i.e., a history of previous voice/text/email contacts at the account level), and the contents of any contact record for the end user. For each message, preferably the following actions are possible: respond, either via predetermined text message (a message template), or via free-form text message; archive; return to queue (so that the message will get assigned to a different agent); or opt-out (at campaign, account, or enterprise level, e.g., based on device of client ID).

As noted above, as one response option, the agent can choose a predefined message template to send a text message. The template may include one or more personalization fields populated from the contact record. The agent may define his or her own message template using conventional GUI or command line interfaces.

As another response option, the agent may enter a telephone number and send a text message to that number. This message may be considered part of the sub-campaign for which the agent is currently processing messages.

As another option, through the portal interface the agent may opt-out (i.e. suppress going forward) the telephone number from which a message is received. In addition, the agent may type in a telephone number or a client ID for opt-out. The agent also can indicate what level (campaign/account/enterprise) and what channel(s) to opt-out. If a telephone number has previously been opted out from receipt of text messages (at the campaign, account or enterprise level), the agent is able to opt-in that number.

The portal also enables an agent to view a list of messages he or she has sent, along with their associated details.

5. Additional Enhancements

The subsystem also provides for short code pooling. In particular, the system enables management (creation, update and/or deletion) of short codes across multiple customers.

In addition, the text messaging subsystem provides support for delivery of text messages to non-North American telephone numbers (i.e. numbers outside of the North American Numbering Plan (NANP). Outside of NANP, telephone numbers, prefixes and country codes vary widely. To provide this support, the subsystem provides the following functions: DST and time zone observance, number length and formatting, wireless/landline identification and filtering, aggregator and SMPP endpoint intelligence, error detection and handling that varies across aggregator or SMPP endpoint, throttling across various aggregator or SMPP endpoints, and the like. If desired, a single list (and a single contact pass) comprises texts destined for multiple countries. Depending on the destination country, the short code and aggregator endpoint may vary.

Use Cases

The above-identified functions may be used in various ways to provide enhanced text messaging. Thus, as an example, the inbound message queue may be established in the agent portal to process "unhandled" or "yet-to-be handled" messages received at the system. (These messages may be received in response to outbound voice or text messages in the usual case). In this example, the inbound message queue has associated therewith a control routine (e.g., implemented in Javascript) which monitors the inbound message for a given top-level keyword (meaning a keyword monitored by the system) and, in response to detecting that keyword, takes a given action (e.g., moves the message to a given sub-queue, or the like). Using a campaign or sub-campaign messaging script, further more "fine-grained" control may be provided with respect to keywords below the top level.

In a preferred embodiment, when an inbound text arrives for handling in the agent portal subsystem (by a particular agent who can handle text messages), the system determines the program family (which is a set of approvals) based on, for example, the carrier (over which the inbound message was sent), originating device and/or destination short code. As noted above, for each of these program families, preferably there is a set of unique top-level keywords that provide one or more desired system-level actions. Sub-campaign scripts then carry out specific actions, preferably keyed by the lower-level keywords in the message. As noted above, a given text messaging script typically has support for embedded contact fields and variables over which the control functions may be programmed. Thus, for a given message (or, more generally, conversation between the agent (the system) and an end user being contacted by the system), different actions can be taken depending on the state of the conversation, keywords used, the value of variables, and the like. This advanced scripting capability provides significantly improved campaign results as compared to the prior art text messaging systems.

The following section provides additional technical details regarding the SMS-based messaging enhancements. As used below, the following terms shall have the following meanings. A short-code is a preferably 4-6 digit number used as a caller-id or inbound device for sending and receiving text messages. A source address (sometimes referred to herein as an "inbound device") is a dedicated phone number, including a short code or long code (10 digit number) that is used to send and receive text messages. An aggregator is an entity, typically distinct from the service provider, which handles mobile terminating/mobile originating (MT/MO) traffic from the service provider and acts as a go-between for one or more telecommunication carriers that handle SMS messages. FTEU refers to free-to-end-user messages that can only be sent on a supported source address. MT refers to a mobile terminated message or a message that is sent to the client device. MO refers to a mobile originated message or a message that is received from the client device. Opt-out refers to a MO message sent in from a client device that indicates the user wishes to be suppressed from future messages from this campaign/account. A "program" refers to an approved text messaging campaign on a particular source address. Example would be banking alerts or credit card collections. A "conversation" refers to a set of back and forth text messages between the service provider system (automatic or via agent) and a client device on a single source address. A "keyword" refers to an unsolicited predefined text message that is sent in from a client device that is mapped to an inbound sub-campaign.

The following describes source address management within the hosted service provider infrastructure. A list of valid source addresses is defined and maintained. A source address has a set of one or more programs that can be run with respect to that address. A source address also will have a set of one or more client device carriers that it can support. This can include U.S. and international carriers. An MT message can be sent to a device on a particular source address if the carrier of the device is supported on the source address. A source address may be restricted so that it is only used by a single service provider account or enterprise, however, typically that account/enterprise will not be limited to use only that source address. Preferably, an individual sub-campaign may send MTs on many source addresses. Preferably, the hosted service provider platform attempts to pick a source address from a pool to help ease the ambiguity associated with determining which sub-campaign owns MO messages that are sent as replies. In particular, preferably the system picks a source address based on the desired program, device carrier, and (optionally) the identity of the service provider account/enterprise. If a single source address is available given the criteria, preferably that address will be used. If, however, multiple source addresses match the criteria, preferably the system automatically picks the source address that has not been used by another service provider account for contacting that particular device. If a source address cannot be found that has not yet been contacted, preferably the oldest used source address is selected to minimize the chances of a user responding to the older message (versus the newer message). If a source address is not available for the desired program and device carrier, the message attempt is considered to be filtered and is marked with a completion status of either program not supported or carrier not supported. A source address/program/carrier combination maybe set as enabled or disabled. The combination may also be set as available only for test.

The service provider text messaging channel provides several primary use cases: (1) dispatching text messages from a text call pass, (2) receiving inbound response MO messages and handling automatic outbound MT responses, (3) receiving inbound keyword MO messages and handling automatic outbound MT responses, and (4) sending messages from the text agent portal UI that are manually initiated by an agent. In the first three use cases, a sub-campaign typically contains a JavaScript-based script file in a custom Java archive file (JAR) that drives the conversation with the client. This script is responsible for deriving the initial text message(s) for dispatch in case (1), as well as handling the responses to MO messages in cases (2) and (3). This occurs when a contact list is sent by a text-messaging pass of a sub-campaign. As is well-known, Javascript is a client-side scripting language used in web applications to control web browser behavior; it can also be used server-side. The JAR file is server-side code that executes in an application server in the service platform described above.

The following describes the mobile originated message handling use case.

The service platform supports conversations that are originated from a mobile device. In particular, the platform is configured to support a list of root-level keywords per source address that map to a running inbound sub-campaign. Preferably, keywords are handled in a case-insensitive way. Each keyword/source address pair is uniquely mapped to a single inbound sub-campaign. An example would be keyword "bank_bal" on source address 70650, which keyword/address pair might be mapped to an inbound sub-campaign that handles any MO messages with that message text on that source address. Preferably, mappings of keywords/source addresses are configured using an enterprise level user interface (UI). Preferably, MO messages that are mapped to a keyword are considered to be conversation starters even if the sending device has an existing active conversation for another sub-campaign. Keyword/source address mappings preferably are used only to define top-level conversation starters. In such case, such mappings cannot be used to construct an interactive back-and-forth survey with the client device. In a typical use scenario, the inbound sub-campaign's configuration is used to define the remainder of the conversation, including how to respond to the initial MO message.

For MO messages that come in as responses to platform-initiated MT messages, the configuration of a sub-campaign preferably determines how MO messages are handled. An MO message is considered a response if (1) it is not a keyword that is defined on the source address that it came on and (2) there has been previous contact with the device on that source address. An MO message that comes in on a source address and that cannot be mapped to a keyword and for which there was no previous contact with that device preferably is mapped to a default inbound sub-campaign. The configuration for that inbound sub-campaign may send that message into the agent portal where the messages can be reviewed periodically. If the inbound device is dedicated to an account, some default inbound sub-campaign on that account handles the message.

The following describes the mobile terminated message handling use case.

Any MT text message that is dispatched from a sub-campaign preferably begins a new conversation regardless of whether the client device has been contacted in the past. MT text messages are dispatched from a text call pass. MT text message attempts are scheduled using call pass times. MT text message pacing is handled with a fixed or auto-paced dispatch rate. Contents of the MT message are defined by the sub-campaign configuration. Multiple text messages can be sent to a single device in a single call pass. The system attempts to group the messages in the same order as they were dispatched. The system also attempts to schedule the messages to go out together. If any message in the group fails immediately, the original message is considered failed for escalation purposes. If any message in the group is not attempted, the original message is considered not attempted for escalation purposes. When dispatching MT messages, the program preferably is defined before an MT can be dispatched.

The following describes how to custom business logic can be defined for MT and MO message handling according to this disclosure.

Preferably, inbound and outbound sub-campaigns have the ability to inject custom business logic for sending out original MT messages, responding to keyword based messages, and responding to service provider-originated MT messages. To this end, as noted above a sub-campaign text messaging configuration identifies custom business logic via Javascript or other similar interpretive programming language. The messaging configuration preferably also has access to a set of application program interfaces (APIs) that implement service provider-specific functionality in Javascript or other scripting code. In particular, a sub-campaign text messaging configuration is presumed to have access to the following entities when it is called to handle dispatching an MT or to respond to an MO: contact fields that were submitted in the contact list, device information for the client device, the incoming MO message, and previous conversations (MT/MOs) that have occurred with the device across one or more sub-campaigns for this account/enterprise. The system default behavior identifies opt-out and help MOs. Preferably, a sub-campaign text messaging configuration has the ability to define whether a particular MO message should be flagged to be viewed by an agent. This puts the MO message in queue to be viewed by an agent in the text agent portal. A sub-campaign text messaging configuration has the ability to store customer specific information when it is executed, and to retrieve that information when it is executed a subsequent time. This is useful for the keeping state information about the client, such as whether right party verification/authentication has been successfully performed on the device within a certain time period. It can also be very useful for sophisticated surveys where the client device's last position and previous responses to that survey can be easily accessed. A sub-campaign text messaging configuration preferably has the ability to define the pre-approved program that is to be used for any MT messages. Any custom business logic that takes longer than a configured amount of time or runs through a configured limit of instructions preferably is terminated by the system.

Certain service provider customers may have keywords reserved on predefined source addresses (short codes) that will allow the platform to know that an incoming MO message needs to be tied to one of the customer's sub-campaigns. This is so the MO can be recorded and a custom script can be run to handle the MO. Also, keywords should be unique enough so that an MO message that is sent as part of a regular conversation is not interpreted as a keyword and then mapped to an incorrect sub-campaign. Keywords are defined and mapped to inbound devices in the platform. The inbound device is then associated with an inbound sub-campaign.

As noted above, preferably every text message that is dispatched from the platform is associated with a program name. The platform includes a database that contains a mapping of all certified programs, source addresses, and carriers. A custom Javascript script is responsible for setting the program name and message text of any MT text message. In particular, the goal of a custom script is to define the program name and message text(s) of MT text messages dispatched from a sub-campaign and to handle MO messages sent from the client device. The system automatically assigns a source address (if one is available) to use based on the program name and the carrier of the device (determined by the system). The custom JS script preferably is called inside of a given workflow. Like an XML script, the JS script has a well defined structure that must be followed which then leads to the custom logic. The custom JS script format has a structure in the form of entry-point methods that the scripts implement. Preferably, the methods that each script implement include the following: begin( ), moHandler( ), optOutHandler( ) and helpHandler( ). These methods are automatically invoked by the platform in certain situations. The begin( ) method is invoked when the system needs to send out an MT message from a call pass. The optOutHandler( ) and helpHandler( ) methods are invoked when an MO opt-out or help messages are received. The moHandler( ) method preferably handles all other MO messages including keyword-based messages.

The begin( )method is called when the platform is preparing a text message request from a text call pass of a sub-campaign to be picked up by an application message server and dispatched to the client. A typical implementation of the begin( ) method constructs a text message using a hard-coded piece of text, optionally pulls in a contact field value into the text, and then fires off the message with a program name.

The optOutHandler( ) method is responsible for handling an MO message that has been designated by the system as an opt-out message. This method typically responds to the opt-out message with an MT response and opts the user out of any future text messaging for this account.

The helpHandler( ) method is responsible for handling an MO message that has been designated by the system as a help message. This method typically responds to the help message with an MT response.

The moHandler( ) method is responsible for handling an MO messages that are not classified by the system as opt-out or help messages. This includes handling of top-level keywords. This method performs any kind of logic similar to the begin method. Its primary role is to optionally derive a response message for the MO and to mark the message to go into the text agent portal.

The platform may also implement a JavaScript API that includes high level methods that each perform a certain task or returns some entity. The entities themselves have methods that perform certain tasks or return other entities. The API may include one or more of the following high level methods:

getCurrentCallPass( ) Method

This method returns a Call Pass entity that represents the current pass that the script is executing under. In the case of MO handling, the call pass will be the pass that sent the original message. The script can have different behavior based on which call pass is running it.

getCurrentContact( ) Method

Returns the current contact entity that is running the script based on the information. For inbound-initiated campaigns, the contact will contain a single device and the client id will be the device.

getCurrentConversation( ) Method

Returns the current conversation entity that has taken place with this client device up to the point the script is executed. The conversation is the set of back and forth messages between the service provider and the client device, as well as any session state left over by previous invocations of the script.

getCurrentDevice( ) Method

Returns the client device that the script is being executed for.

getCurrentSubCampaign( ) Method

Returns the current sub-campaign that is running the script. This may be an outbound or inbound sub-campaign. A script can provide different behavior based on which campaign/sub-campaign is running it allowing multiple campaigns to reference one script.

getInboundContactAttempt( ) Method

Returns the ContactAttempt entity that represents the inbound MO message that the script was called to process.

getScriptContext( ) Method

Returns the current ScriptContext entity, which represents the current execution of the custom script. The ScriptContext maintains the status of the script and allows the script to set it. For example, if a script sees that it is missing a contact field that it needs and cannot send a message otherwise, it may choose to set the status of the script as bad data and the workflow would then automatically treat the attempt as filtered.

sendTextMessage( ) Method

This method queues up an individual text message with the given program name and message text to be sent out after the script terminates. This method may be called multiple times for a single script invocation to create a multiple message attempt group. The message text given is the final text that is sent to the client device without any further manipulation. The program name is used by the workflow to determine which source address/aggregator needs to be used to deliver the message.

sendTextMessageAutoSplit( ) Method

This method has the same functionality as the sendTextMessage( )method except that it has the capability to chop up a text message that is greater than 160 characters into multiple messages. The multiple messages will be treated as a single attempt group in the same way as if the script calls sendTextMessage( ) multiple times.

CallPass Entity

The CallPass entity represents the call pass that is running the current script.

Contact Entity

The Contact entity represents a contact in the system. Custom scripts can use it to tailor messages for each contact.

ContactAttempt Entity

The ContactAttempt entity represents a text messaging attempt to the user. It can be in the form of previous contact attempts that were sent/received from the client device in the context of a conversation, or it can represent the current MO message sent in from the client device.

Conversation Entity

The Conversation entity represents successful back-and-forth messages (with the user) that have taken place at the time the custom script is executed. The conversation is tied to the sub-campaign that is currently running the custom script. The Conversation entity is useful for the custom script to make some decision by looking at the previous Contact Attempts that have taken place. The Conversation entity also maintains session data. Session data comprises variables and name/values that are stored by previous invocations of the custom script so that future invocations understand where they left off with the client device. Custom scripts can add/remove/modify any number of custom named session variables that are maintained in the database. Preferably, session variables have a unique name (within the conversation) and can have a numeric, string or date value. Session variables can be useful for custom reports where the custom script can make it easy for the report to derive certain information about the client message flow. A specific session variable called "nextAction" can be set by the custom script to force the script to automatically execute the named script method the next time an MO message comes in from the client device.

Device Entity

The Device Entity represents the client device that we are dispatching an MT to or are processing an MO from.

ScriptContext Entity

The ScriptContext entity represents the state of the custom script that is executing. It allows the script to set the status that will be communicated back to the workflow.

Figure 4:
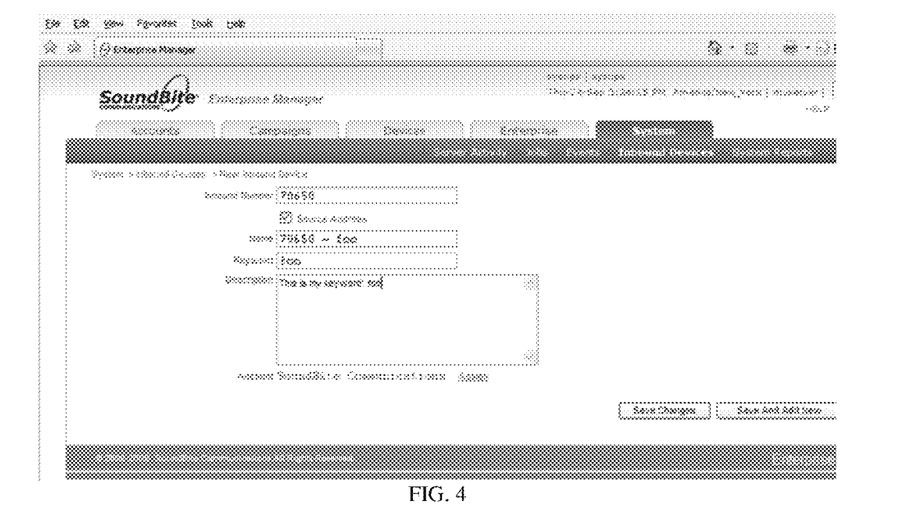
FIG. 4 is a representative display interface screen that is used for associating one or more keywords with a source address (inbound device)
Figure 5:
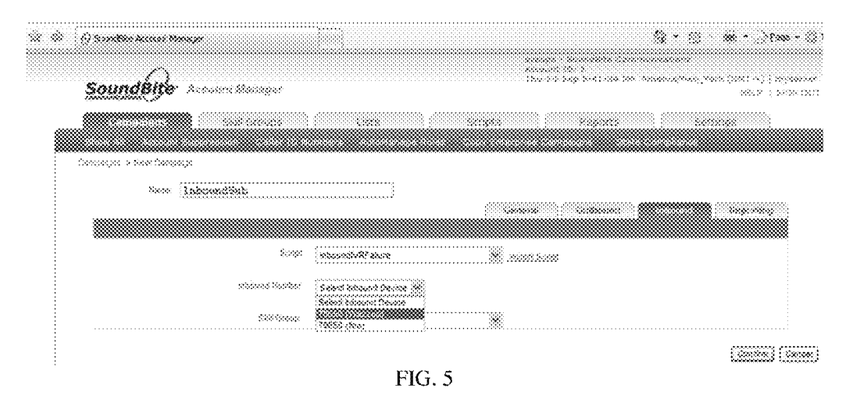
FIG. 5 is a representative display interface screen illustrating how to create a new campaign and associate a script and inbound number to that campaign.

The following provides additional details regarding representative user interface screens for configuration specific text-messaging functionality using custom JS scripts and keyword definition. FIG. 4 is a representative display interface screen that is used for associating one or more keywords with a source address (inbound device). Then, the inbound device can then be assigned to an account. FIG. 5 is a representative display interface screen illustrating how to create a new campaign and associate a script and inbound number to that campaign.

Sub Campaign Entity

The SubCampaign entity represents the sub-campaign that the custom script is running under.

As previously noted, the hardware and software systems in which the subject matter herein is illustrated are merely representative. The described functionality may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation. A given machine includes network interfaces and software to connect the machine to a network in the usual manner. As illustrated in FIG. 1, the subject disclosure may be implemented as a managed service (e.g., in an ASP model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, .ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

Having described our invention, what we now claim is set forth below.

The invention claimed is:

1. A computer program product in a non-transitory computer readable medium for use in a data processing system for managing interactive communications campaigns, wherein a first level keyword/source address pair is associated to an in-bound sub-campaign, the in-bound sub-campaign being configured to process any mobile-originated (MO) messages having the first level keyword on the source address, the computer program product holding computer program instructions, comprising:
    program code to define an in-bound messaging script that includes at least one action to be taken in association with a MO text message, wherein the action is based on one of: a state of a conversation, a second-level keyword, a value of a variable, and an occurrence in the communications campaign; and
    program code operative upon receipt of the MO text message from the source address and that includes the first level keyword to execute the in-bound messaging script with respect to the in-bound sub-campaign.

2. The computer program product as described in claim 1 wherein the occurrence is a transmission of a voice message, and further including program code to cause the messaging script to send the text message as a follow-up to the voice message.

3. The computer program product as described in claim 1 wherein the value of the variable determines whether a given telephone number is wireless and should receive the text message.

4. The computer program product as described in claim 1 wherein the value of the variable determines that an account associated with the messaging script is enabled for text messaging.

5. The computer program product as described in claim 1 wherein the first level keyword is associated with at least one approval associated with a short code.

6. The computer program product as described in claim 1, wherein the second-level keyword triggers the action during the campaign.

7. The computer program product as described in claim 1 further including program code to queue unhandled inbound text messages according to one or more second-level keywords.

8. A system for managing interactive communications campaigns, the system comprising:
    a processor; and
    memory, wherein the memory has stored therein instructions that, when executed by the processor, cause the processor to:
        define an in-bound messaging script that includes at least one action to be taken in association with a mobile-originated (MO) text message, wherein the action is based on one of: a state of a conversation, a second-level keyword, a value of a variable, and an occurrence in a communications campaign; and
        in response to receipt of the MO text message from a source address that includes a first level keyword, execute the in-bound messaging script with respect to an in-bound sub-campaign, wherein a first level keyword/source address pair is associated to the in-bound sub-campaign, and the in-bound sub-campaign is configured to process any mobile-originated messages having the first level keyword on the source address.

9. The system of claim 8, wherein the occurrence is a transmission of a voice message, wherein the instructions further cause the processor to invoke the messaging script to send the text message as a follow-up to the voice message.

10. The system of claim 8, wherein the value of the variable determines whether a given telephone number is wireless and should receive the text message.

11. The system of claim 8, wherein the value of the variable determines that an account associated with the messaging script is enabled for text messaging.

12. The system of claim 8, wherein the first level keyword is associated with at least one approval associated with a short code.

13. The system of claim 8, wherein the second-level keyword triggers the action during the campaign.

14. The system of claim 8, wherein the instructions further cause the processor to queue unhandled inbound text messages according to one or more second-level keywords.

* * * * *